(12) United States Patent
Nakamura (10) Patent No.: US 8,272,216 B2
(45) Date of Patent: Sep. 25, 2012

(54) METHOD FOR CONVERTING SOLAR THERMAL ENERGY

(75) Inventor: Norihiko Nakamura, Mishima (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 203 days.

(21) Appl. No.: 12/071,557

(22) Filed: Feb. 22, 2008

(65) Prior Publication Data

US 2009/0211541 A1 Aug. 27, 2009

(51) Int. Cl.
  *B60K 16/00* (2006.01)
  *F03G 6/00* (2006.01)
  *F03G 6/06* (2006.01)

(52) U.S. Cl. ................. 60/641.8; 60/641.15; 123/3

(58) Field of Classification Search ............ 60/641.8, 60/641.15; 123/3; 423/359; 429/423
See application file for complete search history.

(56) References Cited

U.S. PATENT DOCUMENTS

| | | | |
|---|---|---|---|
| 4,668,494 A | 5/1987 | Van Hook | |
| 6,100,600 A * | 8/2000 | Pflanz | 290/54 |
| 6,505,467 B1 | 1/2003 | Fjellhaug et al. | |
| 7,075,189 B2 * | 7/2006 | Heronemus et al. | 290/44 |
| 7,178,337 B2 * | 2/2007 | Pflanz | 60/641.2 |
| 2003/0168864 A1 * | 9/2003 | Heronemus et al. | 290/55 |
| 2004/0154223 A1 | 8/2004 | Powell et al. | |
| 2005/0026008 A1 | 2/2005 | Heaton et al. | |
| 2006/0049063 A1 | 3/2006 | Murphy et al. | |
| 2006/0127304 A1 | 6/2006 | Fujii et al. | |
| 2006/0210454 A1 * | 9/2006 | Saxena et al. | 422/169 |
| 2006/0243585 A1 * | 11/2006 | Spiegelman et al. | 204/157.5 |
| 2007/0101762 A1 * | 5/2007 | Schaub et al. | 62/617 |
| 2007/0101989 A1 * | 5/2007 | Strathman | 126/636 |
| 2008/0000350 A1 | 1/2008 | Mundschau et al. | |
| 2008/0035346 A1 * | 2/2008 | Nair et al. | 166/302 |
| 2008/0041054 A1 * | 2/2008 | Montesinos | 60/641.8 |
| 2008/0131830 A1 * | 6/2008 | Nix | 432/220 |
| 2008/0138675 A1 * | 6/2008 | Jang et al. | 429/17 |
| 2008/0216478 A1 * | 9/2008 | Cherry | 60/641.2 |
| 2008/0216511 A1 * | 9/2008 | Howard | 62/646 |
| 2008/0283411 A1 * | 11/2008 | Eastman et al. | 205/343 |
| 2008/0311022 A1 * | 12/2008 | Carrington et al. | 423/359 |

(Continued)

FOREIGN PATENT DOCUMENTS

CN 1976167 (A) 6/2007

(Continued)

OTHER PUBLICATIONS

Roeb et al, Solar Hydrogen Production by a Two Step Cycle Based on Mixed Iron Oxides, May 2006, Journal of Solar Engineering, vol. 125, pp. 125-133.*

(Continued)

*Primary Examiner* — Erick Solis
(74) *Attorney, Agent, or Firm* — Oliff & Berridge, PLC (57) ABSTRACT

[Subject]
The subject is to provide a method of converting solar energy into the transportable and stockable secondary energy
[Means for Solving the Problem]
There is provided a method of converting solar thermal energy obtained in a first region into motive power energy used in a second region, the second region having a solar-radiation amount smaller than that of the first region, comprising: synthesizing ammonia from air and water by using, as an energy source; only the solar thermal energy acquired in the first region, transferring the ammonia from the first region to the second region; and, burning the ammonia in the second region such that nitrogen and water are produced, thereby obtaining motive power energy.

16 Claims, 6 Drawing Sheets

U.S. PATENT DOCUMENTS

| | | | |
|---|---|---|---|
| 2008/0314593 A1* | 12/2008 | Vinegar et al. | 166/302 |
| 2009/0014336 A1* | 1/2009 | Olah et al. | 205/450 |
| 2009/0056802 A1* | 3/2009 | Rabani | 136/256 |
| 2009/0071155 A1* | 3/2009 | Boyapati et al. | 60/649 |
| 2009/0120294 A1* | 5/2009 | Schulte et al. | 96/111 |
| 2009/0125127 A1* | 5/2009 | Bergman et al. | 700/80 |

FOREIGN PATENT DOCUMENTS

| | | |
|---|---|---|
| CN | 101077840 (A) | 11/2007 |
| JP | A-50-114625 | 9/1975 |
| JP | A-61-153136 | 7/1986 |
| JP | A-62-502610 | 10/1987 |
| JP | A-05-009769 | 1/1993 |
| JP | A-05-332152 | 12/1993 |
| JP | A-11-046460 | 2/1999 |
| JP | A-2000-178467 | 6/2000 |
| JP | A-2002-520533 | 7/2002 |
| JP | A-2004-035383 | 2/2004 |
| JP | A-2004-525058 | 8/2004 |
| JP | A-2005-044758 | 2/2005 |
| JP | A-2005-154232 | 6/2005 |
| JP | A-2005-200245 | 7/2005 |
| JP | A-2005-281115 | 10/2005 |
| JP | A-2005-337220 | 12/2005 |
| JP | A-2006-319291 | 11/2006 |
| JP | A-2006-526882 | 11/2006 |
| JP | A-2008-508184 | 3/2008 |
| JP | A-2010-159194 | 7/2010 |
| WO | WO02/071451 A2 | 9/2002 |
| WO | WO 2004/109086 | 12/2004 |
| WO | WO 2009/104813 A1 | 8/2009 |
| WO | WO 2009/104820 A1 | 8/2009 |
| WO | WO 2009/116679 A1 | 9/2009 |

OTHER PUBLICATIONS

Lovegrove et al, Developing Ammonia Based Thermochemical Energy Storage for Dish Power Plants, 2004, Solar Energy, vol. 76, pp. 331-337.*

International Search Report mailed Apr. 7, 2009 in Japanese Patent Application No. PCT/JP2009/053613.

Mar. 24, 2009 International Search Report for PCT/JP2009/053624 (with translation).

Apr. 28, 2009 International Search Report for PCT/JP2009/0561013 (with translation).

Norihiko Nakamura et al., U.S. Appl. No. 12/883,808, filed Sep. 16, 2010.

Kyoichi Tange et al., U.S. Appl. No. 12/920,991, filed Sep. 30, 2010.

Translation of International Preliminary Report on Patentability, issued in International Application No. PCT/JP2009/056013, dated Jul. 29, 2010.

Nov. 9, 2011 Chinese Office Action issued in Appln. No. 200980105327.2 w/translation.

Japanese Patent Office, Notice of Reasons for Rejection mailed Jan. 17, 2012 in Japanese Patent Application No. 2008-042012 w/English-language Translation.

Luzzi, A. et al., "Techno-Economic Analysis of a 10 $MW_e$ Solar Thermal Power Plant Using Ammonia-Based Therrnochernical Energy Storage," *Solar Energy*, 1999, pp. 91-101, vol. 66, No. 2.

Kreetz, H. et al., "Maximizing Thermal Power Output of an Ammonia Synthesis Reactor for a Solar Thermochemical Energy Storage System," *Journal of Solar Energy Engineering*, May 2001, pp. 75-82, vol. 123.

Appl, M., "Ammonia," *Ullmann's Encyclopedia of Industrial Chemistry*, 2006, pp. 44, 45, 52, 62, 63, 79, 80, 84, 85, 98-109.

International Search Report issued in International Application No. PCT/JP2010/057918 on Aug. 10, 2010 (with translation).

* cited by examiner

METHOD FOR CONVERTING SOLAR THERMAL ENERGY

TECHNICAL FIELD

The recent global warming grows into an increasingly serious problem and comes to have a possibility of threatening the human survival in the future. The main cause thereof is considered to be carbon dioxide ($CO_2$) released into the atmosphere from fossil fuels that have been used in a large amount as an energy source in the 20th century. Accordingly, it is believed that the continued use of fossil fuels will not be allowed in the near future. On the other hand, the increase in energy demand with the rapid economical growth in so-called developing countries such as China, India and Brazil leads to a fear that the exhaustion of petroleum and natural gas, heretofore considered inexhaustible, becomes a reality.

If this situation continues, as fully expected also from the recent sudden rise in oil price, fossil fuels such as petroleum and natural gas cannot be used as an inexpensive energy source in twenty to thirty years. Consequently, it is demanded to find a new energy source and a new fuel which neither emits carbon dioxide nor depends on the limited fossil fuel.

BACKGROUND ART

As for the alternative energy to replace the fossil fuel energy such as petroleum and natural gas, studies are being made at present on coal energy, biomass energy, nuclear energy, and natural energy such as wind energy and solar energy.

In the case of using coal energy as the alternative energy, a large amount of carbon dioxide is released by the combustion of coal and this is thought to become a problem. For solving this problem, it has been proposed to collect carbon dioxide at the combustion of coal and store the collected carbon dioxide underground, and numerous research projects are being carried out regarding this matter. However, the long-term stable storage of carbon dioxide is not certain and also, the places suitable for storage are unevenly distributed. Furthermore, the high cost required for the recovery and transfer of carbon dioxide and the injection of carbon dioxide into the ground will become a problem. In addition, the possibility that the combustion of coal will raise an environmental issue due to generation of sulfur oxide ($SO_x$), smoke and the like will also become a problem.

The biomass energy as the alternative energy, particularly the biofuel mainly comprising ethanol, is attracting a great deal of attention. However, a large amount of energy is necessary for the production and concentration of ethanol from plants, and this is sometimes disadvantageous from the viewpoint of energy efficiency. Furthermore, in the case of using corn, soybean, sugarcane or the like as the raw material for biofuel, since these are of course used as food and feed, escalation in the price of food and feed is incurred. Accordingly, the biomass cannot be considered as a substantial energy source except for special regions such as Brazil.

Use of nuclear energy as the alternative energy source is not expected to make great and worldwide progress, because no satisfactory solution is found for the treatment of radioactive waste from nuclear power plants and there are many opposing opinions based on the fear of nuclear proliferation. Instead, use of nuclear energy as the alternative energy will decrease in the long term with an increase in the abolishment of aging nuclear reactors.

As described above, all of the coal energy, biomass energy and nuclear energy cannot be said to succeed in solving the problems of sustainability and carbon dioxide generation giving rise to global warming. Consequently, the natural energy such as wind energy and solar energy is considered to be an ideal energy source.

With respect to the use of wind energy as the alternative energy, wind-power-generation plants are recently spreading around the world. However, the suitable places having stable wind and no danger of typhoon, hurricane, thunderbolt or the like, or where the noise generated from a windmill does not become a problem, is limited. Accordingly, wind energy is insufficient by itself, though it is a strong candidate for alternative energy.

Solar energy is believed to be a most stable and intensive natural energy as the alternative energy. Particularly, there are vast deserts near the equator called the Sun Belt of the globe, and the solar energy there is almost inexhaustible. In this respect, it is assumed that energy as much as 7,000 GW can be obtained by the use of a few percent of the area of the deserts extending in the southwestern area of the United States, and that all of the energy for all human beings can be supplied by the use of only a few percent of the area of the desserts in the Arabian Peninsula and North Africa.

In this way, the solar energy is very potent as the alternative energy, however, from a practical use standpoint, it is considered necessary to solve the problems that (1) the energy density of solar energy is low and (2) the storage and transfer of solar energy are difficult.

As for the problem that the energy density of solar energy is low, a resolution by collecting solar energy by means of a massive collector has been proposed. However, the storage and transport of solar energy are very difficult in particular when the transport distance is long and the amount of energy is large.

Solar energy is generally converted into electric power as the secondary energy directly by a solar cell or indirectly by a steam turbine or the like, and thereby turned into a form convenient for use and transport. When solar energy is converted into electric power, the electric power energy can be transferred on an electric power transmission line, and therefore the problem of energy transfer is overcome in principle. However, in the case where a plant for obtaining electric power energy from solar energy is installed in a solar energy-rich desert region, a high-capacity electric power transmission line needs to be newly built and maintained, but this is difficult in many cases. Furthermore, it is thought very difficult to transfer the electric power energy obtained from solar energy, for example at a plant in a desert region to another continent or island country across the ocean.

Storage of the electric power sometimes becomes a problem. Development of a battery for storing electric power is a previously-existing major theme and is being continued all over the world. However, even the most-advanced lithium ion battery is not satisfactory with regard to the storage of a large amount of electric power, and a battery particularly for a large amount of electric power needs to be developed in terms of safety. Also, in the plant for obtaining electric power energy from solar energy, a massive thermal storage unit, an auxiliary boiler and the like, as well as the battery, are required in case power generation becomes difficult due to bad whether or the like, and these constitute a huge construction cost.

Studies are being also made to convert solar energy as the primary energy into hydrogen as the secondary energy, and synthesize ammonia, methane or the like by using the obtained hydrogen as a raw material (see, Patent Document 1).

Hydrogen is attracting attention as clean energy, but similar to electric power, its storage is a major problem. For the supply to a fuel cell, much research on hydrogen storage have been recently carried out, and it is becoming apparent that the practical application thereof is not easy. Also, as for the transfer of hydrogen, the construction of hydrogen pipelines is more difficult than the construction of electric power transmission lines. In particular, the construction of a hydrogen pipeline network infrastructure for the supply to users is difficult. Furthermore, liquid hydrogen must be stored at −253° C., and therefore storage of liquid hydrogen can not be considered at present, except for special usages such as space development.

[Patent Document 1] Japanese Unexamined Patent Publication No. 2006-319291

DISCLOSURE OF THE INVENTION

Problems to be Solved by the Invention

As described above, although efforts to convert solar energy as the ultimate sustainable energy into electric power, hydrogen or the like as the secondary energy are being made at present all over the world, there are large problems in the storage and transfer of such secondary energy. Unless the problems regarding the storage and transfer of the energy are overcome, worldwide distribution as well as usage in a mobile body such as a vehicle, airplane or ship will be very difficult to attain.

An object of the present invention is to solve the problem of solar energy regarding storage and transfer, and enable worldwide use of solar energy, and thereby solving the problem of emission of carbon dioxide which is a greenhouse gas and the problem of depletion of petroleum oil.

Means to Solve the Problems

A first set of methods aiming to attain the above-described subject is disclosed in the following (A1) to (A20).

(A1) A method for converting solar thermal energy obtained in a first region into motive power energy used in a second region, the second legion having a solar-radiation amount smaller than that of the first region, comprising:
synthesizing ammonia from air and water by using, as an energy source, only the solar thermal energy acquired in the first region,
transferring the ammonia from the first region to the second region, and
burning the ammonia in the second region such that nitrogen and water are produced, thereby obtaining motive power energy.

(A2) The method as described in (A1) above, wherein in the transfer step, the ammonia is used as a fuel to obtain at least a part of the electric power and/or motive power necessary for performing the transfer.

(A3) The method as described in (A1) or (A2) above, wherein the nitrogen and water produced in the burning step are released into the atmosphere and reused as ammonia source in the synthesis step.

(A4) The method as described in any one of (A1) to (A3) above, wherein the motive power energy is acquired by using an internal combustion engine.

(A5) The method as described in any one of (A1) to (A4) above, wherein the step of synthesizing the ammonia comprises:
(1) performing a reaction to produce hydrogen from water by using a part of the acquired solar thermal energy; and, (2) performing a reaction to synthesize ammonia from nitrogen and the hydrogen obtained in the step (1), by using another part of the acquired solar thermal energy.

(A6) The method as described in any one of (A1) to (A5) above, wherein at least a part of the electric power and/or motive power necessary for performing the synthesis step is obtained by using the acquired solar thermal energy.

(A7) The method as described in any one of (A1) to (A6) above, wherein at least a part of the electric power, motive power and/or heat necessary for performing the synthesis step is obtained by using the synthesized ammonia as a fuel.

(A8) The method as described in any one of (A5) to (A7) above, wherein in the step (1), the reaction to produce hydrogen from water is performed by using the acquired solar thermal energy directly as a heat source.

(A9) The method as described in (A8) above, wherein at least a part of the solar thermal energy used as a heat source in the step (1) is obtained by a parabolic dish-type collector and/or a solar tower-type collector.

(A10) The method as described in (A6) or (A7) above, wherein in the step (1), the reaction to produce hydrogen from water is performed by using the electric power as a heat source.

(A11) The method as described in (A6) or (A7) above, wherein in the step (1), the reaction to produce hydrogen from water is performed by electrolyzing water with use of the electric power.

(A12) The method as described in (A10) or (A11) above, wherein the solar thermal energy is acquired by a parabolic trough-type collector.

(A13) The method as described in any one of (A5) to (A12) above, wherein in the step (2), ammonia is synthesized from nitrogen and hydrogen by using the acquired solar thermal energy directly as a heat source and/or as a motive power source.

(A14) The method as described in (A13) above, wherein the solar thermal energy used as a heat source in the step (2) is obtained by a parabolic trough-type collector.

(A15) The method as described in any one of (A5) to (A7) above, wherein in the step (1), the reaction to produce hydrogen from water is performed by using the acquired solar thermal energy directly as a heat source; at least a part of the solar thermal energy used as a heat source in the step (1) is obtained by a parabolic dish-type collector and/or a solar tower-type collector; in the step (2), the reaction to synthesize ammonia from nitrogen and hydrogen is performed by using the acquired solar thermal energy directly as a heat source and/or as a motive power source; and, the solar thermal energy used as a heat source in the step (2) is obtained by a parabolic trough-type collector.

(A16) The method as described in (A6) or (A7) above, wherein the nitrogen is obtained by subjecting the air to cryogenic separation using the electric power and/or motive power.

(A17) The method as described in any one of (A5) to (A15) above, wherein the nitrogen is obtained by burning the hydrogen obtained in the step (1) to consume oxygen in the air.

(A18) A method for using solar thermal energy obtained in a first region, as motive power energy used in a second region, the second region having a solar-radiation amount smaller than that of the first region, comprising:
synthesizing ammonia from air and water by using, as an energy source, only the solar thermal energy acquired in the first region; and,
transferring the ammonia to the second region in order to obtain motive power energy by burning the ammonia in such a way that nitrogen and water are produced.

(A19) A method for using solar thermal energy obtained in a first region, as motive power energy used in a second region, the second region having a solar-radiation amount smaller than that of the first region, comprising:

receiving, in the second region, ammonia synthesized from air and water by using, as an energy source, only the solar thermal energy acquired in the first region; and, burning the ammonia such that nitrogen and water are produced in the second region, thereby obtaining motive power energy.

(A20) A method for converting solar thermal energy obtained in a first region into motive power energy used in a second region, the second region having a solar-radiation amount smaller than that of the first region, comprising:

collecting sunlight to acquire solar thermal energy by a solar thermal energy acquisition apparatus in the first region;

synthesizing ammonia from air and water by using, as an energy source, only the solar thermal energy acquired by an ammonia synthesis apparatus in the first region;

liquefying the ammonia by an ammonia-liquefaction apparatus in the first region;

transferring the liquefied ammonia by an ammonia-transportation apparatus from the first region to the second region; and, burning the ammonia by a motive power energy-generation apparatus in the second region such that nitrogen and water are produced, thereby obtaining motive power energy.

A second set of methods aiming to attain the above-described subject is described in the following (B1) to (B14).

(B1) A method for storing solar thermal energy, comprising;

(a) acquiring solar thermal energy;

(b) performing a reaction to produce hydrogen from water by using a part of the acquired solar thermal energy; and, (c) performing a reaction to synthesize ammonia from nitrogen and the hydrogen obtained in the step (b), by using another part of the acquired solar thermal energy.

(B2) The method as described in (B1) above, wherein at least a part of the electric power and/or motive power necessary for performing the method is obtained by using the solar thermal energy acquired in the step (a).

(B3) The method as described in (B1) or (B2) above, wherein at least a part of the electric power, motive power and/or heat necessary for performing the method is obtained by using the synthesized ammonia as a fuel.

(B4) The method as described in any one of (B1) to (B3) above, wherein only the solar thermal energy acquired in the step (a) is used as an energy source.

(B5) The method as described in any one of (B1) to (B4) above, wherein in the step (b), the reaction to produce hydrogen from water is performed by using the solar thermal energy acquired in the step (a) directly as a heat source.

(B6) The method as described in (B5) above, wherein at least a part of the solar thermal energy used as a heat source in the step (b) is obtained by a parabolic dish-type collector and/or a solar tower-type collector.

(B7) The method as described in (B2) or (B3) above, wherein in the step (b), the reaction to produce hydrogen from water is performed by using the electric power as a heat source.

(B8) The method as described in (B2) or (B3) above, wherein in the step (b), the reaction to produce hydrogen from water is performed by electrolyzing water with use of the electric power.

(B9) The method as described in (B7) or (B8) above, wherein in the step (a), the solar thermal energy is acquired by a parabolic trough-type collector.

(B10) The method as described in any one of (B1) to (B9) above, wherein in the step (c), ammonia is synthesized from nitrogen and hydrogen by using the solar thermal energy acquired in the step (a) directly as a heat source and/or as a motive power source.

(B11) The method as described in (B10) above, wherein the solar thermal energy used as a heat source in the step (c) is obtained by a parabolic trough-type collector.

(B12) The method as described in any one of (B1) to (B4) above, wherein: in the step (b), the reaction to produce hydrogen from water is performed by using the solar thermal energy acquired in the step (a) directly as a heat source; at least a part of the solar thermal energy used as a heat source in the step (b) is obtained by a parabolic dish-type collector and/or a solar tower-type collector; in the step (c), the reaction to synthesize ammonia from nitrogen and hydrogen is performed by using the solar thermal energy acquired in the step (a) directly as a heat source and/or as a motive power source; and, the solar thermal energy used as a heat source in the step (c) is obtained by a parabolic trough-type collector.

(B13) The method as described in (B2) or (B3) above, wherein the nitrogen is obtained by subjecting the air to cryogenic separation using the electric power and/or motive power.

(B14) The method as described in any one of (B1) to (B12) above, wherein the nitrogen is obtained by burning the hydrogen obtained in the step (b) to consume oxygen in the air.

Effects of the Invention

According to the above-described methods, the problems of the global warming and the depletion of petroleum oil and natural gas can be overcome by using almost inexhaustible solar thermal energy through conversion or storage thereof.

BEST MODE FOR CARRYING OUT THE INVENTION

As regards the storage and transfer of solar energy, the following three substances are considered to be candidates for a liquid fuel which can be produced from water, air and solar thermal energy and is easy to store and transfer:

(1) hydrogen peroxide ($H_2O_2$);
(2) hydrazine ($NH_2NH_2$); and,
(3) ammonia ($NH_3$).

Among these substances, in view of easy handleability, ammonia is expected to be a useful candidate. Ammonia is a highly irritating gas and is a deleterious substance that causes damage to the respiratory system when a high-concentration gas thereof is inhaled. However, by virtue of its strong odor, the gas leakage even in a small amount of about 5 ppm, which is $1/1,000$ or less of the lethal amount, can be detected by a human being, and occurrence of accidental leakage on the actual market is seldom reported. For example, ammonia is being used as a cooling medium for a refrigerator in a fishing boat or the like, along with chlorofluorocarbon, but fatal accidents due to the leakage of ammonia is about $1/10$ of the death ratio at the leakage of harmless and odorless chlorofluorocarbon. Also, the disaster by explosion during the transfer of ammonia is $1/5$ or less of that for gasoline or liquefied petroleum gas (LPG).

Furthermore, the global ammonia production at present is about 150 million tons per year, and a large amount of ammonia is mainly used for fertilizers. Also from such actual use in a large amount on the market, ammonia is believed to have sufficiently high social receptivity Ammonia has physical characteristics close to those of LPG and is easily liquefied under about 8 atms at ordinary temperature, and the storage and transfer thereof have satisfactory results and are not particularly problematic. Also, ammonia is defined as a nonflammable substance, and has small ignition ability, low combustion speed even on ignition, and narrow combustion range, and therefore, its handling is considered to be no particular problem.

The energy density of ammonia is about half that of the gasoline and almost equal to that of the methanol. However, in the theoretical mixing, the calorific value of ammonia is greater than that of gasoline, and therefore ammonia is satisfactorily applicable as a fuel even for a mobile body. Furthermore, ammonia can be supplied to a remotely-located thermoelectric power generation plant by a tanker or the like, and burned instead of natural gas or coal. In this case, the theoretical efficiency of ammonia is considered to surpass that of natural gas and coal.

In the combustion of ammonia, a combustion reaction represented by the following formula A can be performed:

$$2NH_3 + 3/2 O_2 \rightarrow N_2 + 3H_2O + \text{(heat generation)}] \quad \text{(Formula A)}$$

That is, carbon dioxide is not produced in the combustion of ammonia, and there arises no problem regarding global warming.

Incidentally, it is described, for example in Japanese Unexamined Patent Publication No. 5-332152, to obtain the motive power by burning ammonia as above.

<Energy Conversion Method>

Figure 1:
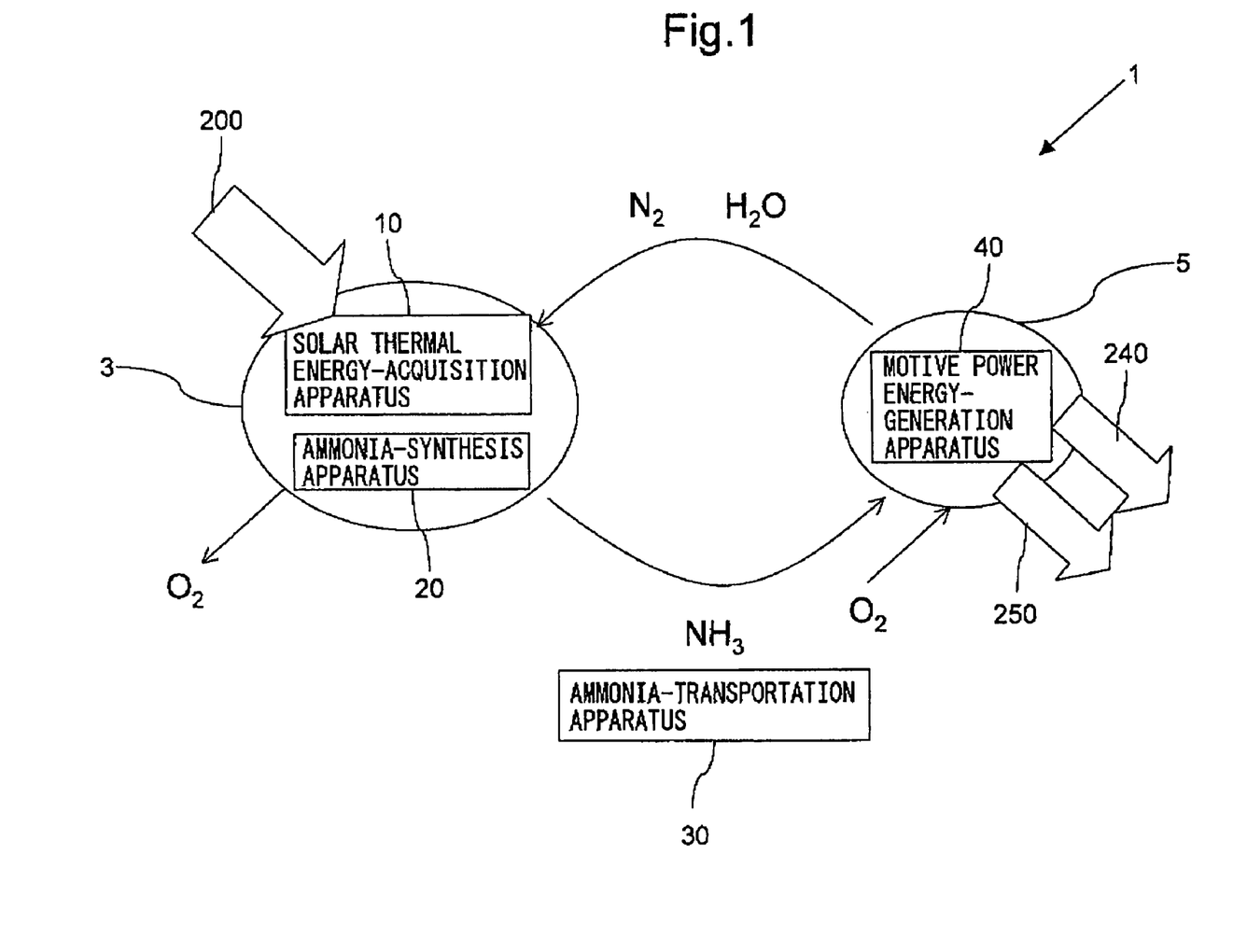
FIG. 1 A view for explaining one example of a conversion system 1.

A conversion system 1 for converting solar thermal energy into motive power energy is described below with reference to FIG. 1.

The conversion system 1 comprises a solar thermal energy-acquisition apparatus 10 for collecting sunlight 200 to produce solar thermal energy, an ammonia-synthesis apparatus 20 for synthesizing ammonia from water and air by using the solar thermal energy (details of ammonia synthesis are described later regarding the solar thermal energy storing method), an ammonia-transportation apparatus 30, and a motive power energy-generation apparatus 40 for burning the ammonia to produce motive power energy.

The solar thermal energy-acquisition apparatus 10 and the ammonia-synthesis apparatus 20 are disposed in a first region 3, and the motive power energy-generation apparatus 40 is disposed in a second region 5 geographically different from the first region 3.

The ammonia synthesis reaction from air and water is, as described later, an endothermal reaction as a whole. Accordingly, the ammonia-synthesis apparatus 20 uses the solar thermal energy as a reaction heat to produce ammonia ($NH_3$) and oxygen ($O_2$) from nitrogen ($N_2$) contained in air and water ($H_2O$). The produced ammonia is optionally liquefied, and then transferred as a fuel from the first region 3 to the second region 5 by the ammonia-transportation apparatus 30. In the second region 5, the ammonia is burned by the motive power energy-generation apparatus 40 such that nitrogen and water are produced, thereby motive power energy 240 and thermal energy 250 are produced.

Nitrogen and water are harmless substances present in a large amount in the atmosphere. Therefore, when nitrogen and water produced by the combustion are released into the atmosphere, they circulate according to convection flows present in the natural world and can be again used as raw materials of the ammonia-synthesis apparatus 20 located in the first region 3.

The conversion system 1 has an energy balance of inputting sunlight 200 and outputting motive power energy 240 and thermal energy 250 and, on the other hand, has a material balance by the following circulation loop: nitrogen+water→ammonia+oxygen (synthesis of ammonia), and ammonia+oxygen→nitrogen+water (combustion of ammonia). In all steps of the conversion system 1, a chemical substance containing a carbon atom is not required and therefore, carbon dioxide ($CO_2$) is not discharged at all.

In this way, the conversion system 1 uses ammonia produced with use of air and water, as a conveyance substance of the solar thermal energy, thereby the solar thermal energy acquired in the first region 3 can be used as the motive power energy in the second region 5. Also, the conversion system 1 performs the energy conversion by the circulation of chemical substances (water, nitrogen in air, and ammonia) each having no carbon atom, and therefore does not discharge carbon dioxide in all steps of the system.

Incidentally, the solar thermal energy-acquisition apparatus 10 is preferably disposed in a region having a large solar-radiation amount, and therefore the first region is preferably a region having a solar-radiation amount larger than the second region wherein the motive power energy is used. The ammonia-synthesis apparatus 20 also discharges oxygen. Oxygen is a valuable substance for the production of chemical products, and therefore, an equipment using oxygen may be provided in the first region.

Figure 2:
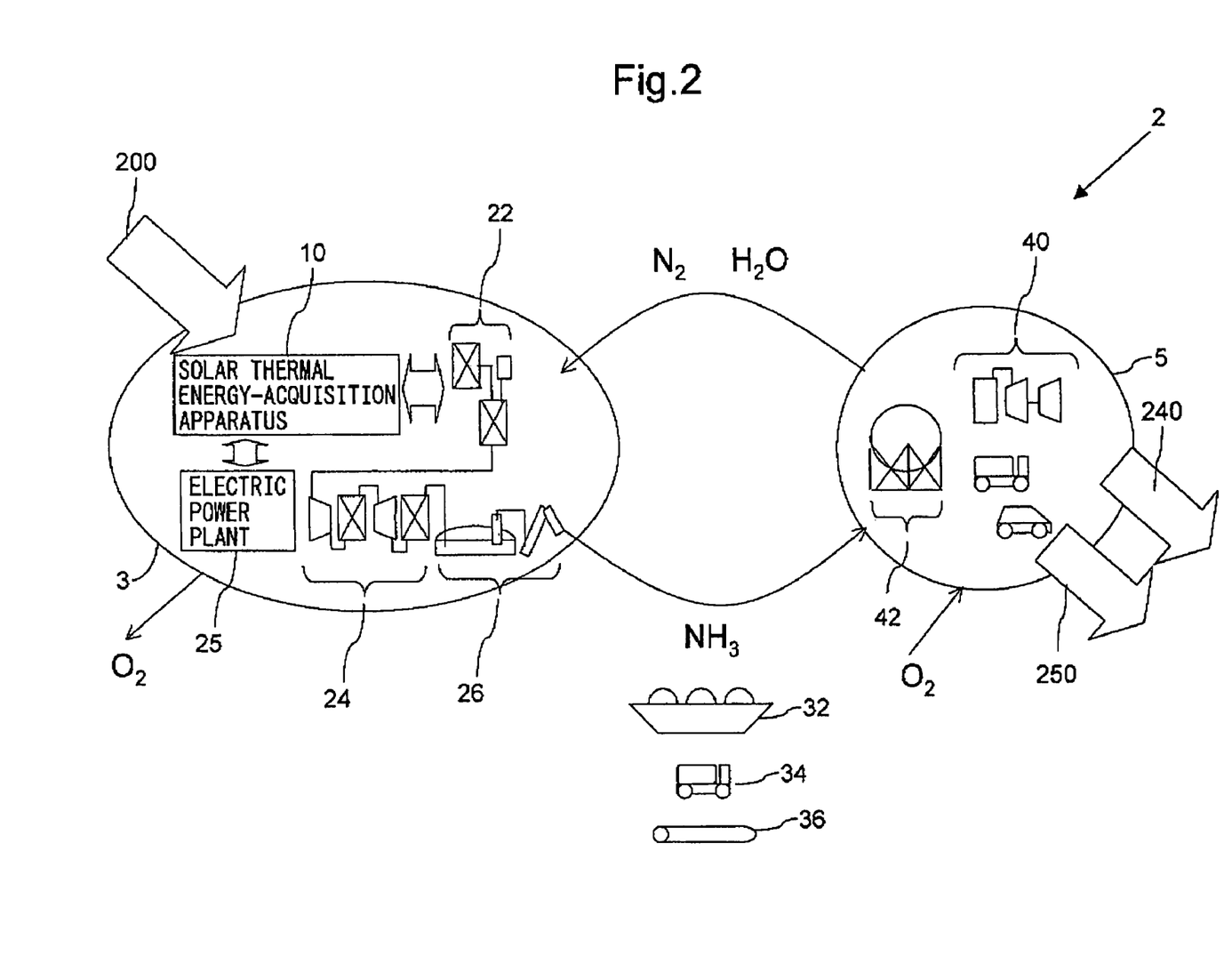
FIG. 2 A view for explaining one example of a conversion system 2.

One example of the conversion system 2 is described below with reference to FIG. 2.

As shown in the figure, the ammonia-synthesis apparatus 20 comprises an ammonia-synthesis plant 22, an ammonia liquefaction apparatus 24 for compressing and liquefying ammonia with cooing water and then chilling the liquefied ammonia by refrigerant which is obtained by expanding the compressed ammonia; an electric power generating plant 25 for generating an electric power with use of a steam turbine using steam produced by the solar heat or with use of a gas turbine (including a combined type with a steam turbine) using the combustion of ammonia; a offloading equipment for liquefied ammonia 26; a cooling tower (not shown) for cooling water; and, a water-treatment apparatus (not shown) for purifying water from well water, seawater and the like. Incidentally, as for the ammonia-synthesis plant 22, the description regarding the solar thermal energy storing method below may be referred to.

The ammonia-transportation apparatus 30 is a liquefied-ammonia ship 32 in the case of marine transportation, and a tank truck 34 or a pipeline 36 in the case of ground transportation.

In the second region 5, the ammonia is received by ammonia-receiving equipment 42, or the ammonia is directly supplied to a motive power energy-generation apparatus 40. The motive power energy-generation apparatus 40 (e.g. gas turbine, automobile) acquires the motive power energy from the ammonia combustion by an internal combustion engine.

In this way, the conversion system 2 uses ammonia produced from air and water, as a conveyance substance of the solar thermal energy, thereby the solar thermal energy acquired in the first region 3 can be used as the motive power energy in the second region 5. Also, the conversion system 2 performs the energy conversion by the circulation of chemical substances (water, nitrogen in air, and ammonia) each having no carbon atom and therefore, carbon dioxide is not discharged in the solar thermal energy-acquisition apparatus 10 and ammonia-synthesis apparatus 20 of the first region, as well as in the motive power energy-generation apparatus 40 of the second region.

Figure 3:
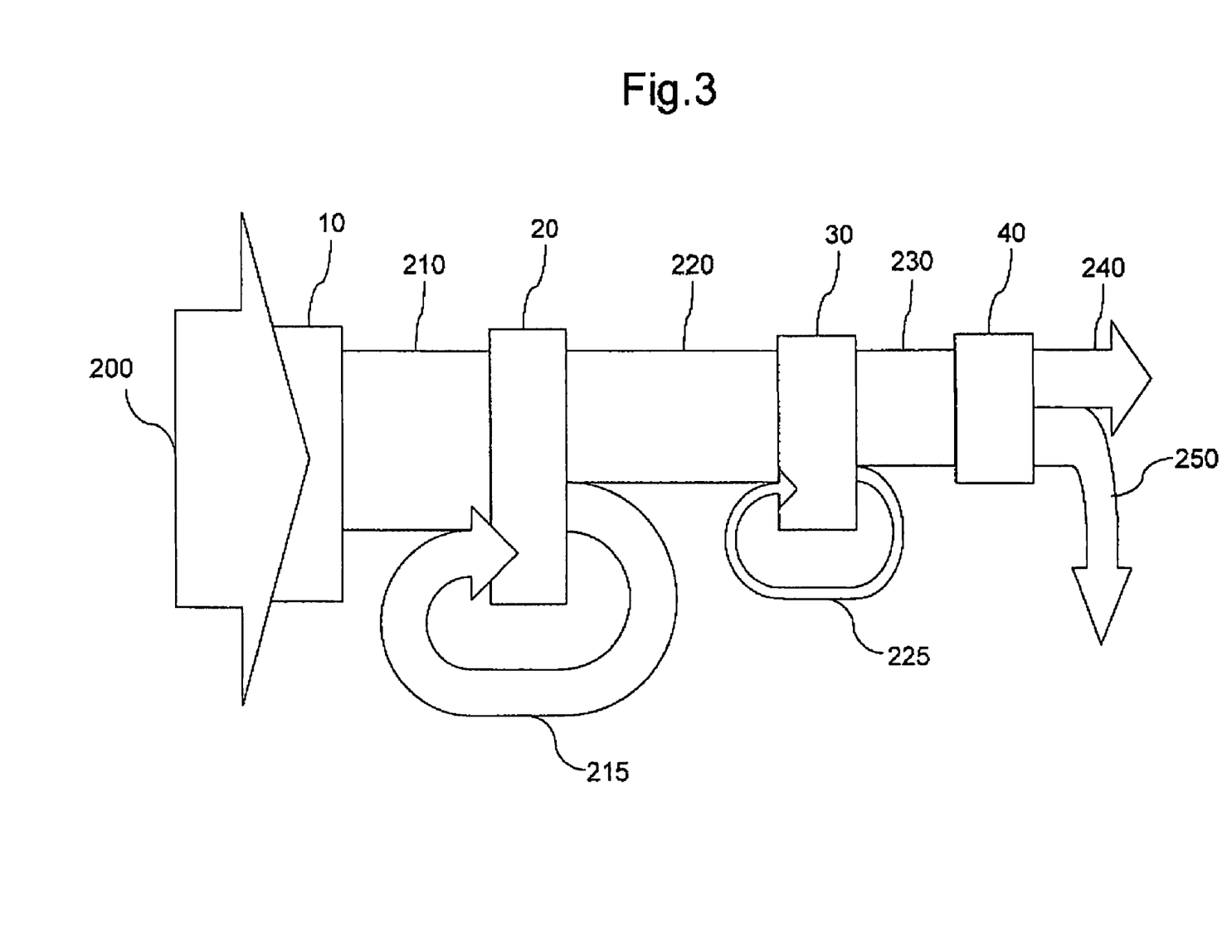
FIG. 3 A view for explaining energy flow of the conversion system 1.

The energy flow of the conversion system 1 is described below with reference to FIG. 3.

Sunlight 200 is converted into solar thermal energy 210 through a solar thermal energy-acquisition apparatus 10. The solar thermal energy 210 is converted into chemical energy 220 as potential energy of ammonia by an ammonia-synthesis apparatus 20. A part 215 of the solar thermal energy 210 is used as a heat source, a motive power source and/or an electric power source in the ammonia-synthesis apparatus 20.

The chemical energy 220 is transferred by an ammonia-transportation apparatus 30 from the first region 3 to the second region 5. In the transfer, the ammonia-transportation apparatus 30 can use a part of the chemical energy 220 (i.e. energy obtained by burning a part of the transferred ammonia by an internal combustion engine of the ammonia-transportation apparatus 30) as transfer energy 225 (i.e. as at least part of electric power and/or motive power necessary for the transportation). In this case, the chemical energy 220 is partially consumed by the ammonia-transportation apparatus 30, and after the transfer to the second region 5, becomes chemical energy 230.

The chemical energy 230 is converted into motive power energy 240 and thermal energy 250 through a motive power energy-generation apparatus 40 which burns the ammonia such that nitrogen and water are produced. (Although not shown, waste heat energy may be generated in the ammonia-synthesis apparatus 20 and the ammonia-transportation apparatus 30.)

In this way, by using the chemical energy of ammonia, the sunlight 200 input in the first region 3 is transferred to the second region 5 in the form of the motive power energy 240 and thermal energy 250. The conversion system 1 does not require use of an energy source other than sunlight 200. Accordingly, the conversion system 1 enables converting solar thermal energy 210 into motive power energy 240 without discharging carbon dioxide in all steps of the system.

<Solar Thermal Energy Storing Method>

The method for storing solar thermal energy comprises: (a) acquiring solar thermal energy; (b) performing a reaction to produce hydrogen from water by using a part of the acquired solar thermal energy, for example as a part of a heat source, a motive power source and/or an electric power source, particularly by using the energy directly as a heat source or as an electric power source; and, (c) performing a reaction to synthesize ammonia from nitrogen and the hydrogen obtained in the step (b) by using another part of the acquired solar thermal energy, for example as a heat source, a motive power source and/or an electric power source, particularly by using the energy as a heat source and/or a motive power source.

According to this energy storing method, ammonia is synthesized using solar thermal energy, so that the solar thermal energy can be stored in the form of chemical energy of ammonia.

In a preferred embodiment of this method, at least a part of the electric power and/or motive power necessary for performing this method is obtained by using the solar thermal energy acquired in the step (a). In another preferred embodiment, at least a part of the electric power, motive power and/or heat necessary for performing this method is obtained by using the synthesized ammonia as a fuel. In still another preferred embodiment, only the solar thermal energy acquired in the step (a) is used as an energy source.

Examples of the electric power necessary for performing this method include electric power used in driving a pump/compressor for flowing and/or compressing a fluid such as raw material, and electric power for further heating the heat source. Examples of the motive power necessary for performing this method include motive power used in driving of a pump/compressor for flowing and/or compressing a fluid such as raw material. Examples of the heat necessary for performing this method include heat for further heating the heat source. In order to elevate the temperature of the heat source to a temperature which is higher than that obtained directly by the solar thermal energy, it is sometimes preferred to supply a part of the thermal energy for the heat source by electric power.

According to these embodiments, the method can be performed while reducing or preferably eliminating the use of conventional fossil fuels such as petroleum.

The entire reaction in the synthesis of ammonia from water and nitrogen is represented by the following formula (B):

$$N_2 + 3H_2O \rightarrow 2NH_3 + 3/2 O_2 \text{ (endothermic)} \quad \text{(Formula B)}$$

In the solar thermal energy storing method, ammonia ($NH_3$) is synthesized from water ($H_2O$) and nitrogen ($N_2$) through a reaction between hydrogen ($H_2$) and nitrogen ($N_2$) by using the solar thermal energy as an energy source for the reaction. The solar thermal energy storing method is described in detail below.

<Solar Thermal Energy Storing Method—Step (a) (acquisition of solar thermal energy)>

In the solar thermal energy storing method, solar thermal energy is acquired in the step (a).

In the step (a), any light collector can be used for acquiring solar thermal energy. For example, the following light collectors (1) to (3) can be used (1) Parabolic Dish Type The parabolic dish-type collector shown in FIG. 4 comprises a dish reflector part 141 for collecting light by reflecting sunlight 200, and a light-receiving part 142 for receiving the collected light. The solar thermal energy is acquired in this light-receiving part 142. The solar thermal energy obtained in the light-receiving part 142 can be transferred to an appropriate portion by optionally using a heat medium such as molten alkali metal (e.g. molten metal sodium), molten salt, oil and steam.

Figure 4:
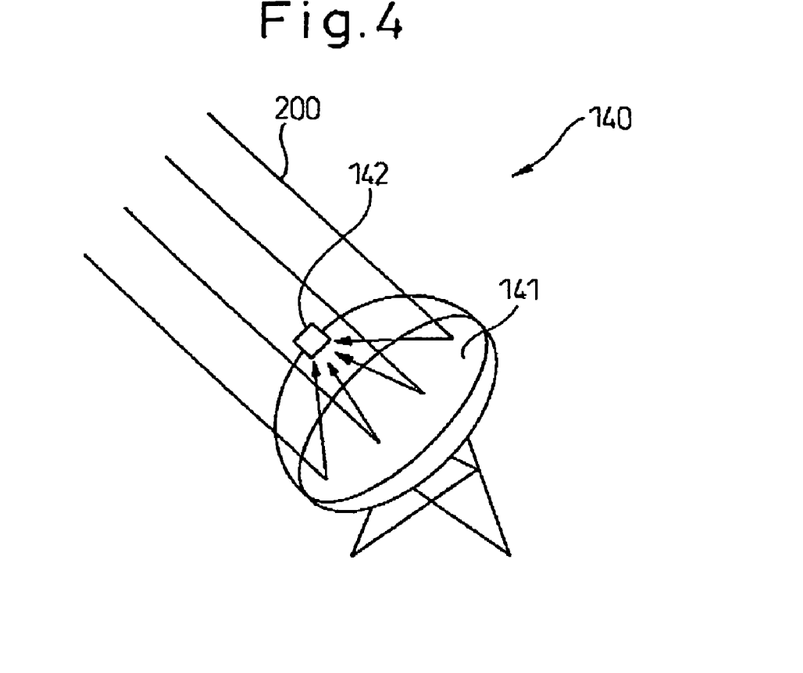
FIG. 4 A schematic view showing a parabolic dish-type collector.

The light collector of this type is suitable for a relatively small plant and is preferably used in the solar thermal energy range of approximately from 10 kW to several hundreds kW. In general, the light collector of this type has high light-collecting power, and a high-temperature heat source of 2,000° C. or more can be obtained, but the cost is relatively high.

(2) Solar Tower Type

Figure 5:
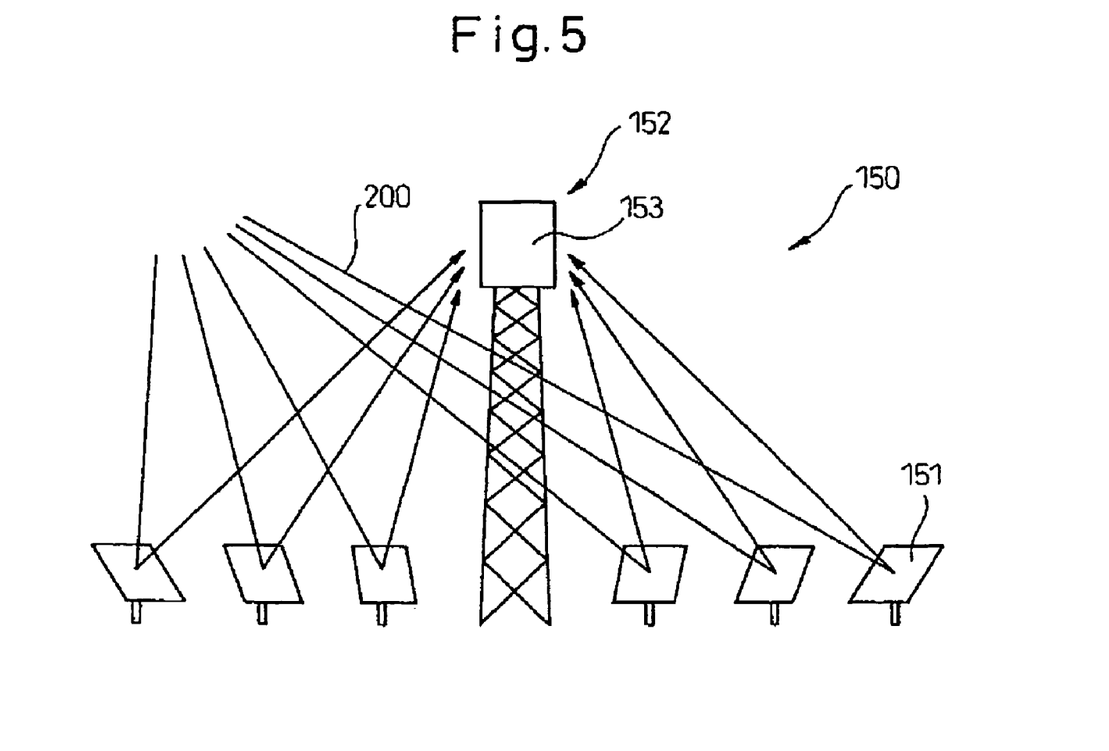
FIG. 5 A schematic view showing a solar tower-type collector.

The solar tower-type collector shown in FIG. 5 comprises a plurality of heliostats (reflector parts) 151 for collecting light by reflecting sunlight 200, and a light-receiving part 153 for receiving the collected light. The solar thermal energy is acquired in this light-receiving part 153. The light-receiving part 153 is disposed at the top of the light-receiving tower 152. The solar thermal energy obtained in the light-receiving part 153 can be transferred to an appropriate portion by optionally using a heat medium.

The light collector of this type is suitable for a large plant of 10 MW to several hundreds MW. In general, the light collector of this type has large light-collecting power, and a high-temperature heat source of several thousands ° C. can be obtained, but the construction cost of the tower is high and a high-level technique is required to control the mirror reflectors.

(3) Parabolic Trough Type

Figure 6:
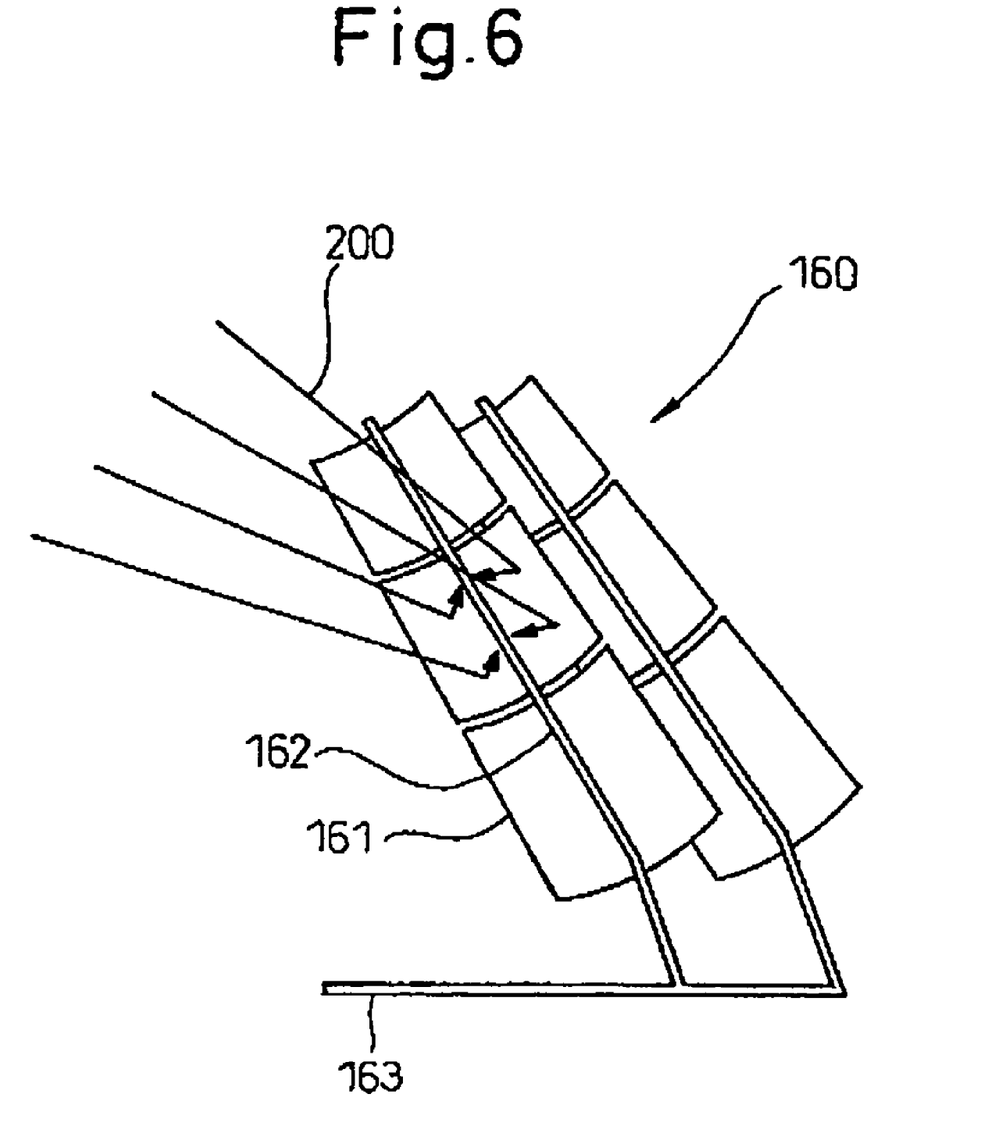
FIG. 6 A schematic view showing a parabolic trough-type collector.

The parabolic trough-type collector shown in FIG. 6 comprises a trough reflector part 161 for collecting light by reflecting sunlight 200 and a light-receiving part 162 for receiving the collected light. The solar thermal energy is acquired in this light-receiving part 142. The solar thermal energy obtained in the light-receiving part 162 can be transferred to an appropriate portion by optionally conducting a heat medium through a heat medium flow path 163.

The light collector of this type enjoys a simple structure and a low cost, and is suitable for a large plant of generally several hundreds MW, but the light-collecting power is low and the heat source obtained is a low-temperature heat source of 400 to 500° C.

In this way, the light collector each has advantages and disadvantages. Accordingly, in the energy storing method, any one of these light collectors or a combination thereof may be used. Specifically, the solar thermal energy for a high-temperature heat source can be obtained by a light collector having large light-collecting power (for example a parabolic dish-type collector and/or a solar tower-type collector) and at the same time, the other solar thermal energy, for example solar thermal energy for a low-temperature heat source or generation of motive power and/or electric power can be obtained by a light collector having small light-collecting power (for example a parabolic trough-type collector).

For instance, the solar thermal energy obtained by a light collector having large light-collecting power can be set to be ½ or less, for example from ⅓ to ½, of the total solar thermal energy obtained by a light collector having large light-collecting power and a light collector having small light-collecting power. In view of the cost of the entire collector equipment, it is sometimes preferred that the ratio of a light collector having large light-collecting power, which generally costs high, is limited in this way.

<Solar Thermal Energy Storing Method—Step (b) (production of hydrogen)>

In the solar thermal energy storing method, a reaction to produce hydrogen from water is performed in the step (b) by using a part of the acquired solar thermal energy, particularly by using only the acquired solar thermal energy, as an energy source.

In the step (b), for obtaining hydrogen from water, any method can be used. Specifically, fox example the following water splitting processes (1) to (3) are well known, along with electrolysis of water. These processes focus on lowering the reaction temperature required for the decomposition reaction of water.

(1) Direct Process

This is a most fundamental process, and water is directly decomposed into hydrogen and oxygen at a high temperature according to the reaction represented by the following formula 1:

$$H_2O \rightarrow H_2 + \tfrac{1}{2}O_2 \text{ (at 2,000° C. or more)} \quad \text{(Formula 1)}$$

This reaction originally requires a temperature of several thousands ° C., but can be achieved at a temperature around 2,000° C. by using a catalyst.

(2) Zn (Zinc) Process

In order to lower the temperature required in the reaction shown by the formula (1) above, there is a process of decomposing water through mediation of a third substance A representative example thereof is a process of performing the decomposition through mediation of zinc. In this case, the reactions are as follows:

$$Zn + H_2O \rightarrow ZnO + H_2 \text{ (about 400° C.)} \quad \text{(Formula 2)}$$

$$ZnO \rightarrow Zn + 1/2 O_2 \text{ (about 1,500° C.)} \quad \text{(Formula 3)}$$

Total Reaction: $H_2O \rightarrow H_2 + \tfrac{1}{2}O_2$

This process requires two kinds of heat sources: a high-temperature heat source (about 1,500° C.), and a low-temperature heat source (400° C.).

(3) I-S (Iodine-Sulfur) Cycle Process

As regards the method for more decreasing the reaction temperature more than in the process (2) above, an I-S cycle process is known and the reactions thereof are as follows:

$$H_2SO_4 \rightarrow H_2O + SO_2 + \tfrac{1}{2}O_2 \text{ (about 950° C.)} \quad \text{(Formula 4)}$$

$$2H_2O + SO_2 + I_2 \rightarrow H_2SO_4 + 2HI \text{ (about 130° C.)} \quad \text{(Formula 5)}$$

$$2HI \rightarrow H_2 + I_2 \text{ (about 400° C.)} \quad \text{(Formula 6)}$$

Total reaction: $H_2O \rightarrow H_2 + \tfrac{1}{2}O_2$

This process requires two kinds of heat sources: a high-temperature heat source (950° C.) and a low-temperature heat source (400° C.).

As described above, at least in a part of these reactions of (1) to (3) for producing hydrogen from water by using heat, a heat source having a relatively high temperature is required.

This heat source having a relative high temperature can be provided by using the solar thermal energy acquired in the step (a) directly as a heat source. In this case, at least a part of the required solar thermal energy can be obtained by a light collector having large light-collecting power, for example a parabolic dish-type collector and/or a solar tower-type collector.

Also, in order to obtain this heat source having a relative high temperature, electric power, particularly electric power obtained by using the solar thermal energy acquired in the step (a), or electric power obtained by using the synthesized ammonia as a fuel. Furthermore, in the case of obtaining hydrogen without using a heat source having a relatively high temperature, that is in the case of obtaining hydrogen by the electrolysis of water, electric power, particularly electric power obtained by using the solar thermal energy acquired in the step (a), or electric power obtained by using the synthesized ammonia as a fuel can be used.

In this way, in the case of providing a heat source having a relatively high temperature by using electric power or in the case of hydrolyzing water by using electric power, the acquisition of solar thermal energy in the step (a) can be performed by a light collector having small light-collecting power, for example by a parabolic trough-type collector. This is preferred in view of cost of the entire collector equipment.

<Solar Thermal Energy Storing Method—Step (c) (Synthesis of ammonia)>

In the solar thermal energy storing method, a reaction to produce ammonia from nitrogen and the hydrogen obtained in the step (b) is performed in the step (c) by using a part of the acquired solar thermal energy, particularly by using only the acquired solar thermal energy, as an energy source.

In the step (c), synthesis of ammonia from nitrogen and hydrogen can be achieved by any method.

About hundred years ago, Haber and Bosch in Germany first succeeded in the mass production of ammonia by chemical synthesis, and the ammonia contributes as a nitrogen fertilizer to the increased production of food The Haber-Bosch process is an endothermic reaction shown below, and because of its simplicity and relatively high efficiency, is still being used at present fundamentally without any change, and this process can be used also in the energy storing method.

$$N_2 + 3H_2 \rightarrow 2NH_3 \text{ (about 400° C.)} \quad \text{(Formula 8)}$$

As shown in the formula, a heat source having a relatively low temperature (400° C.) is used in this reaction. Incidentally, this reaction has been heretofore performed by using an iron catalyst, but in recent years, ruthenium is also used in order to further lower the reaction temperature. In the case where the reaction temperature is low, the yield of ammonia becomes high as indicated by the equilibrium theory and therefore, studies are also being made in order to lower the reaction temperature.

The heat source having a relatively low temperature for this reaction and/or the motive power for this reaction can be provided by using the solar thermal energy acquired in the step (a). In this case, the required solar thermal energy can be obtained by a light collector having small light-collecting power, for example by a parabolic trough-type collector.

Incidentally, in order to obtain nitrogen for the solar thermal energy storing method, the following methods (1) and (2) are applicable.

(1) Cryogenic Separation

In this method, air is compressed under cooling to produce liquid air, and nitrogen is separated from the liquid air by using the difference in the boiling point between oxygen and nitrogen. In this method, high-purity nitrogen is obtained, but large-scale equipment and a relatively large quantity of energy are required.

For this cryogenic separation of air, electric power and/or motive power obtained by using the solar thermal energy acquired in the step (a), or electric power and/or motive power obtained by using the synthesized ammonia as a fuel can be used. Also in this step, production of carbon dioxide due to use of fossil fuels can be reduced or preferably eliminated.

(2) Removal of Oxygen by Combustion

In conventional ammonia plants using a natural gas, oxygen in air is consumed in the reforming step for obtaining hydrogen, and carbon monoxide and carbon dioxide are removed by absorption from the remaining mixed gas, thereby a nitrogen gas is obtained. This method may be used also in the energy storing method, but in this case, a purification treatment for reducing the concentrations of carbon monoxide and carbon dioxide contained in the nitrogen gas to 10 ppm or less is sometimes required. If this treatment is not performed, the carbon monoxide and carbon dioxide may adsorb to the ammonia synthesis catalyst to accelerate deterioration of the catalyst.

(3) On the other hand, in one embodiment of the energy storing method, a nitrogen gas may also be produced by burning the produced hydrogen ($H_2$) with air ($4N_2+O_2$) as shown in the following formula 7 and thereby consuming oxygen in the air:

$$2H_2+4N_2+O_2 \rightarrow 4N_2+2H_2O \quad \text{(Formula 7)}$$

In this case, since the combustion product is water only, and carbon monoxide and carbon dioxide are not produced as the combustion product, the requirement for removal of carbon monoxide and carbon dioxide is reduced, or depending on the case, is eliminated. Incidentally, this reaction is an exothermic reaction and, if desired, the motive power or the like required for the energy storing method can also be created by using the thermal energy generated here.

Figure 7:
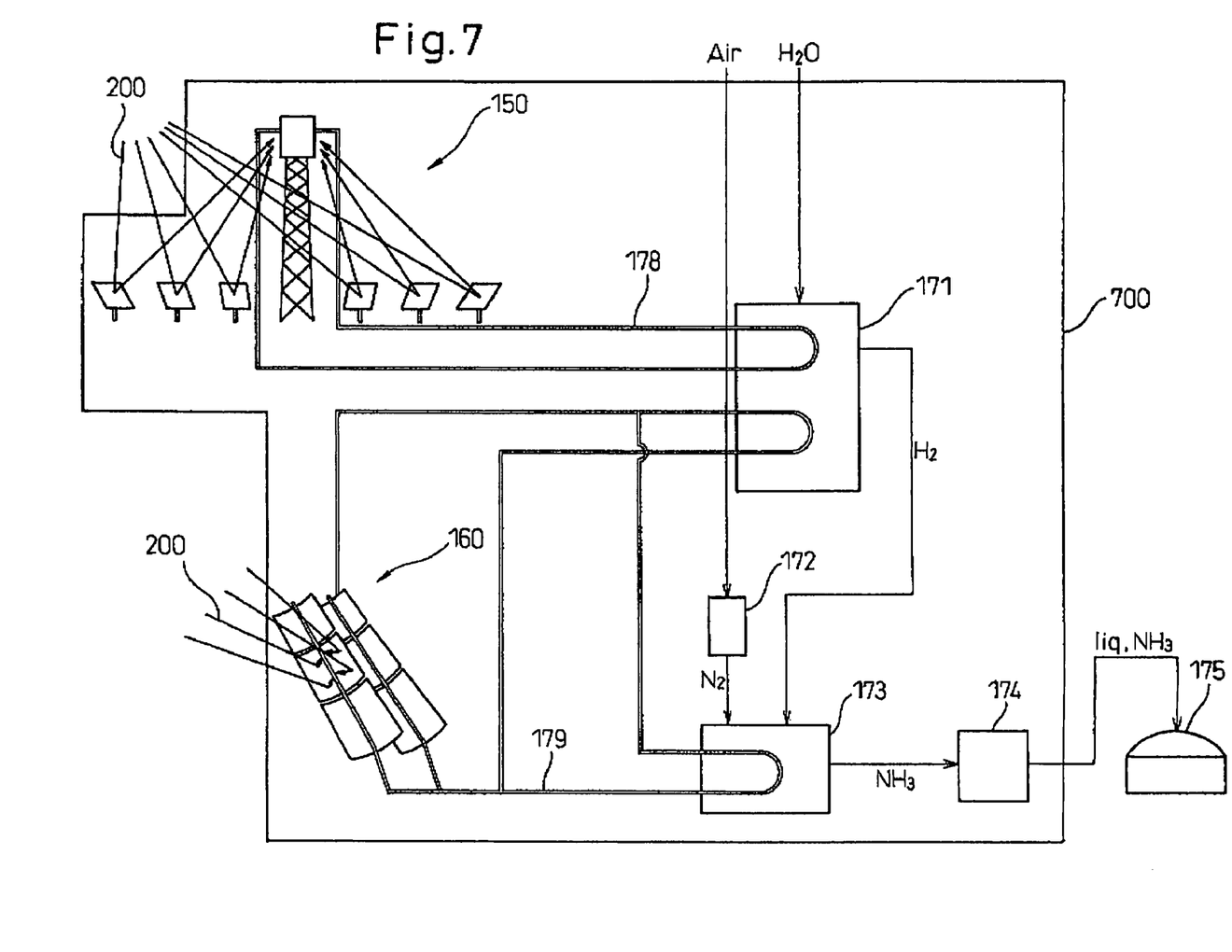
FIG. 7 A view showing an example of equipment for performing the solar thermal energy storing method.

One example of the solar thermal energy storing method can be performed by using the equipment shown in FIG. 7.

In the equipment shown in FIG. 7, solar thermal energy is acquired by a solar tower-type collector 150 having relatively large light-collecting power, and the solar thermal energy obtained here is transferred to a reaction apparatus 171 by a pipeline 178 for flowing a molten salt as a heat medium. Also, solar thermal energy is acquired by a parabolic trough-type collector 160 having relatively small light-collecting power, and the solar thermal energy obtained here is transferred to the reaction apparatus 171 by a pipeline 179 for flowing steam as a heat medium.

In the reaction apparatus 171, a reaction to produce hydrogen from water is performed by using, as a high-temperature heat source, the thermal energy supplied from the solar tower-type collector 150 having relatively large light-collecting power, and using, as a low-temperature heat source and/or a motive power source, the thermal energy supplied from the parabolic trough-type collector 160 having relatively small light-collecting power, thereby hydrogen is obtained.

Also, solar thermal energy is acquired by a parabolic trough-type collector 160 having relatively small light-collecting power and transferred to a reaction apparatus 173 by a pipeline 179 for flowing steam as a heat medium. In the reaction apparatus 173, a reaction to synthesize ammonia from nitrogen and hydrogen is performed by using the solar thermal energy as a heat source and/or a motive power source, thereby ammonia is obtained. The nitrogen supplied to the reaction apparatus 173 is obtained by cryogenically separating air in a cryogenic separation apparatus 172, and hydrogen supplied to the reaction apparatus 173 is obtained in the reaction apparatus 171.

That is, in the method of this example, only sunlight energy 200, water ($H_2O$) and air are supplied to the system of equipment 700 for performing the solar thermal energy storing method, and ammonia ($NH_3$) is obtained therefrom. Accordingly, in this example, the solar thermal energy is stored in the form of chemical energy of ammonia, and generation of carbon dioxide is not involved.

The ammonia obtained in the reaction apparatus 173 is optionally liquefied by a liquefaction apparatus 174 and then stored in a storage tank 175 until shipping. The solar thermal energy may be used also as a motive power source for the liquefaction apparatus.

In the example shown in FIG. 7, another light collector having relatively large light-collecting power, for example a parabolic dish-type collector, may be used in place of the solar tower-type collector 150. Also, only one kind of a light collector may be used in place of using two kinds of light collectors: solar tower-type collector 150 and parabolic trough-type collector 160.

DESCRIPTION OF NUMERICAL REFERENCES

1, 2 Conversion system
3 First region
5 Second region
10 Solar thermal energy-acquisition apparatus
20 Ammonia-synthesis apparatus
24 Ammonia-liquefaction apparatus
30 Ammonia-transportation apparatus
40 Motive power energy-generation apparatus
141, 151, 161 Reflector part
142, 153, 162 Light-receiving part 140 Parabolic dish-type collector
150 Solar tower-type collector
160 Solar trough-type collector
200 Sunlight
210 Solar thermal energy
240 Motive power energy
250 Thermal energy
700 Equipment for performing solar thermal energy storing method

The invention claimed is:

1. A method for converting solar thermal energy obtained in a first region into motive power energy used in a second region, the second region having a solar-radiation amount smaller than that of the first region, the method comprising:
   (1) synthesizing ammonia from air and water by using, as an energy source, only the solar thermal energy acquired in the first region;
   (2) transferring the ammonia from the first region to the second region; and
   (3) burning the ammonia in the second region such that nitrogen and water are produced, thereby obtaining motive power energy; wherein
   the step of synthesizing the ammonia further includes:
      performing a reaction to produce hydrogen from water by using a part of the acquired solar thermal energy; and
      performing a reaction to a synthesize ammonia from nitrogen and the hydrogen obtained in the step (1), by using another part of the acquired solar thermal energy, wherein the nitrogen is obtained by burning the hydrogen in the step (1) to consume oxygen in the air;
      the reaction to produce hydrogen from water is performed by using the acquired solar thermal energy directly as a heat source; and
      the obtained nitrogen gas is subjected to a purification treatment to reduce a concentration of carbon monoxide and carbon dioxide contained in the nitrogen gas to 10 ppm or less; and
   in the transfer step, the ammonia is used as a fuel for an internal combustion engine to obtain at least part of electric power and/or motive power necessary for performing the transfer.

2. The method according to claim 1, wherein the nitrogen and water produced in the burning step are released into the atmosphere and reused as ammonia source in the synthesis step.

3. The method according to claim 1, wherein the motive power energy is acquired by using the internal combustion engine.

4. The method according to claim 1, wherein at least a part of the electric power and/or motive power necessary for performing the synthesis step is obtained by using the acquired solar thermal energy.

5. The method according to claim 1, wherein at least a part of the electric power, motive power and/or heat necessary for performing the synthesis step is obtained by using the synthesized ammonia as fuel.

6. The method according to claim 1, wherein at least a part of the solar thermal energy used as a heat source in the step (1) is obtained by a parabolic dish-type collector and/or a solar tower-type collector.

7. The method according to claim 1, wherein the solar thermal energy is acquired by a parabolic trough-type collector.

8. The method according to claim 1, wherein in the step (2), ammonia is synthesized from nitrogen and hydrogen by using the acquired solar thermal energy directly as a heat source and/or as a motive power source.

9. The method according to claim 8, wherein the solar thermal energy used as a heat source in the step (2) is obtained by a parabolic trough-type collector.

10. The method according to claim 1, wherein: in the step (1), the reaction to produce hydrogen from water is performed by using the acquired solar thermal energy directly as a heat source; at least a part of the solar thermal energy used as a heat source in the step (1) is obtained by a parabolic dish-type collector and/or a solar tower-type collector; in the step (2), the reaction to synthesize ammonia from nitrogen and hydrogen is performed by using the acquired solar thermal energy directly as a heat source and/or as a motive power source; and, the solar thermal energy used as a heat source in the step (2) is obtained by a parabolic trough-type collector.

11. The method according to claim 4, wherein the nitrogen is obtained by subjecting the air to cryogenic separation using the electric power and/or motive power.

12. A method for using solar thermal energy obtained in a first region, as motive power energy used in a second region, the second region having a solar-radiation amount smaller than that of the first region, comprising:
   synthesizing ammonia from air and water by using, as an energy source, only the solar thermal energy acquired in the first region, and
   transferring the ammonia to the second region in order to obtain motive power energy by burning the ammonia in such a way that nitrogen and water are produced, wherein
   the step of synthesizing the ammonia further includes:
      performing a reaction to produce hydrogen from water by using a part of the acquired solar thermal energy; and
      performing a reaction to synthesize ammonia from nitrogen and the hydrogen obtained in the synthesizing step, by using another part of the acquired solar thermal energy, wherein
      the nitrogen is obtained by burning the hydrogen in the synthesizing step to consume oxygen in the air; and
      the reaction to produce hydrogen from water is performed by using the acquired solar thermal energy directly as a heat source; and
   in the transfer step, the ammonia is used as a fuel for an internal combustion engine to obtain at least part of electric power and/or motive power necessary for performing the transfer.

13. A method for using solar thermal energy obtained in a first region, as motive power energy used in a second region, the second region having a solar-radiation amount smaller than that of the first region, comprising:
   receiving, in the second region, ammonia synthesized from air and water by using, as an energy source, only the solar thermal energy acquired in the first region; and,
   burning the ammonia such that nitrogen and water are produced in the second region, thereby obtaining motive power energy; wherein
   method further comprises:
      performing a reaction to produce hydrogen from water by using a part of the acquired solar thermal energy; and
      performing a reaction to synthesize ammonia from nitrogen and the hydrogen obtained in synthesizing the ammonia, by using another part of the acquired solar thermal energy, wherein the nitrogen is obtained by burning the hydrogen in synthesizing the ammonia to consume oxygen in the air; and the reaction to produce hydrogen from water is performed by using the acquired solar thermal energy directly as a heat source; and in the transfer step, the ammonia is used as a fuel for an internal combustion engine to obtain at least part of electric power and/or motive power necessary for performing the transfer.

14. A method for converting solar thermal energy obtained in a first region into motive power energy used in a second region, the second region having a solar-radiation amount smaller than that of the first region, comprising:

collecting sunlight to acquire solar thermal energy by a solar thermal energy acquisition apparatus in the first region;

synthesizing ammonia from air and water by using, as an energy source, only the solar thermal energy acquired by an ammonia synthesis apparatus in the first region;

liquefying the ammonia by an ammonia-liquefaction apparatus in the first region;

transferring the liquefied ammonia by an ammonia-transportation apparatus from the first region to the second region; and, burning the ammonia by a motive power energy-generation apparatus in the second region such that nitrogen and water are produced, thereby obtaining motive power energy; wherein the step of synthesizing the ammonia further includes:

performing a reaction to produce hydrogen from water by using a part of the acquired solar thermal energy; and performing a reaction to synthesize ammonia from nitrogen and the hydrogen obtained in the synthesizing step, by using another part of the acquired solar thermal energy, wherein the nitrogen is obtained by burning the hydrogen in the synthesizing step to consume oxygen in the air; and the reaction to produce hydrogen from water is performed by using the acquired solar thermal energy directly as a heat source; and in the transfer step, the ammonia is used as a fuel for an internal combustion engine to obtain at least part of electric power and/or motive power necessary for performing the transfer.

15. The method according to claim 1, wherein the ammonia produced in the synthesizing step is liquefied.

16. The method according to claim 1, wherein carbon dioxide is not discharged in any of the steps.

* * * * *